United States Patent
Mitra et al.

(10) Patent No.: US 10,149,376 B2
(45) Date of Patent: Dec. 4, 2018

(54) WATER INJECTION AND VENTING OF A PLASMA ARC TORCH

(71) Applicant: Hypertherm, Inc., Hanover, NH (US)

(72) Inventors: Madhura Mitra, Lebanon, NH (US);
Soumya Mitra, Lebanon, NH (US);
Stephen Liebold, Grantham, NH (US)

(73) Assignee: Hypertherm, Inc., Hanover, NH (US)

( * ) Notice: Subject to any disclaimer, the term of this patent is extended or adjusted under 35 U.S.C. 154(b) by 838 days.

(21) Appl. No.: 14/567,387

(22) Filed: Dec. 11, 2014

(65) Prior Publication Data

US 2016/0174353 A1    Jun. 16, 2016

(51) Int. Cl.
*B23K 9/00* (2006.01)
*H05H 1/42* (2006.01)
*H05H 1/34* (2006.01)
*B23K 10/00* (2006.01)

(52) U.S. Cl.
CPC ............... *H05H 1/42* (2013.01); *B23K 10/00* (2013.01); *H05H 1/34* (2013.01); *H05H 1/341* (2013.01)

(58) Field of Classification Search
CPC .......... B23K 10/00; H05H 1/34; H05H 1/341; H05H 1/42
USPC ............ 219/121.44, 121.53, 121.54, 121.55, 219/121.59, 121.51, 121.49, 121.52, 219/121.5, 74, 75, 121.39, 121.47, 121.56
See application file for complete search history.

(56) References Cited

U.S. PATENT DOCUMENTS

| | | | |
|---|---|---|---|
| 3,641,308 A | 2/1972 | Couch, Jr. et al. | |
| 4,743,734 A | 5/1988 | Garlanov et al. | |
| 5,166,494 A * | 11/1992 | Luo | B23K 10/00 219/121.51 |
| 5,247,152 A * | 9/1993 | Blankenship | H05H 1/28 219/121.48 |
| 5,317,126 A * | 5/1994 | Couch, Jr. | H05H 1/34 219/121.48 |
| 6,054,669 A | 4/2000 | Warren | |
| 6,121,570 A * | 9/2000 | Oakley | H05H 1/36 219/121.44 |
| 6,156,995 A | 12/2000 | Severance, Jr. | |

(Continued)

FOREIGN PATENT DOCUMENTS

WO         93/13905        7/1993

OTHER PUBLICATIONS

International Search Report for corresponding PCT application PCT/US2015/064265 dated Mar. 10, 2016, 16 pages.

(Continued)

*Primary Examiner* — Dana Ross
*Assistant Examiner* — Ket D Dang
(74) *Attorney, Agent, or Firm* — Proskauer Rose LLP (57) ABSTRACT

A plasma arc torch system comprising a plasma arc torch is provided. The torch includes an electrode, a nozzle, a vent passage and a shield. The nozzle is spaced from the electrode to define a plasma chamber therebetween. The plasma chamber is configured to receive a plasma gas. The vent passage, disposed in the nozzle body, is configured to divert a portion of the plasma gas exiting the plasma chamber from a nozzle exit orifice. The shield is spaced from the nozzle to define a flow region therebetween. The flow region is configured to (i) receive a liquid and (ii) expel the liquid along with a plasma arc substantially surrounded by the liquid via a shield exit orifice.

16 Claims, 9 Drawing Sheets

(56) References Cited

U.S. PATENT DOCUMENTS

| | | | | |
|---|---|---|---|---|
| 8,338,740 B2* | 12/2012 | Liebold | ............... | H05H 1/28 |
| | | | | 219/121.5 |
| 8,742,284 B2* | 6/2014 | Li | ............... | H05H 1/34 |
| | | | | 219/121.48 |
| 2005/0035093 A1* | 2/2005 | Yamaguchi | ............ | B23K 10/00 |
| | | | | 219/121.39 |
| 2008/0093346 A1* | 4/2008 | Yamaguchi | ............ | H05H 1/28 |
| | | | | 219/121.49 |
| 2013/0264317 A1* | 10/2013 | Hoffa | ............... | B23K 10/006 |
| | | | | 219/121.53 |

OTHER PUBLICATIONS

Hypertherm, Training and Education/Intro to Plasma/What is Plasma?/ http://www.hypertherm.com/un-us-Training_and_education/Intro_to_plasma/What_is_Plasma; printed Feb. 6, 2015; two pages.

* cited by examiner

WATER INJECTION AND VENTING OF A PLASMA ARC TORCH

FIELD OF THE INVENTION

The present invention generally relates to an improved plasma arc torch system and an improved approach for operating the plasma arc torch system.

BACKGROUND OF THE INVENTION

Thermal processing torches, such as plasma arc cutting torches, are widely used in the cutting, gouging and marking of materials. A plasma arc torch generally includes an electrode, a nozzle having a central exit orifice mounted within a torch body, electrical connections, passages for cooling, and passages for arc control fluids (e.g., plasma gas). Optionally, a swirl ring is employed to control fluid flow patterns in the plasma chamber formed between the electrode and the nozzle. In some torches, a retaining cap can be used to maintain the nozzle and/or swirl ring in the plasma arc torch. In operation, the torch produces a plasma arc, which is a constricted jet of mostly ionized gas with high temperature and that can have sufficient momentum to assist with removal of molten metal.

Traditionally, a plasma arc torch can cut metal workpieces (e.g., stainless steel or aluminum workpieces) using a plasma gas, such as nitrogen $N_2$, a mixture of 35% hydrogen and 65% argon (H35), or a mixture of 95% nitrogen and 5% hydrogen (F5). Because these gases are relatively expensive to produce and obtain, they can increase the overall cost of torch operations. In addition, cut speeds are limited by cut quality considerations.

SUMMARY OF THE INVENTION

Thus, systems and methods are needed to enhance plasma arc torch performance by (i) reducing cost, especially in cutting operations, and (ii) improving cut quality for high-speed operations. As explained below, the simultaneous use of multiple arc constricting techniques can result in exceptional cutting results. For example, embodiments of the invention improve cutting operations by using a plasma arc torch that is equipped with a vented nozzle and provided with a liquid (e.g., water) as shield fluid. Such a combination reduces operation cost while achieving higher cut speed and enhanced cut quality. The reduced cost is partly due to the use of inexpensive fluids (e.g., $N_2$ plasma gas and/or water shield fluid) as a cutting medium, which is much cheaper than using traditional fluids (e.g., H35 or F5 plasma gas and N2 shield gas). The present technology also includes an efficient shield fluid delivery system configured to promote higher cut speed and better cut edge appearance.

In one aspect, a plasma arc torch system comprising a plasma arc torch is provided. The torch includes an electrode, a nozzle, a vent passage, and a shield. The nozzle is spaced from the electrode to define a plasma chamber therebetween. The nozzle comprises a nozzle body and a nozzle exit orifice. The plasma chamber is configured to receive a plasma gas. The vent passage, disposed in the nozzle body, is configured to divert a portion of the plasma gas exiting the plasma chamber from the nozzle exit orifice. The shield is spaced from the nozzle to define a flow region therebetween. The shield comprises a shield exit orifice in fluid communication with the nozzle exit orifice. The flow region is configured to (i) receive a liquid and (ii) expel the liquid along with a plasma arc substantially surrounded by the liquid via the shield exit orifice.

In some embodiments, the plasma arc torch system further comprises a supply system that includes a liquid source for supplying the liquid, a liquid supply conduit for conducting the liquid from the liquid source to the torch, and an activation valve disposed between the liquid source and the torch along the liquid supply conduit. The activation valve is configured to enable or disable a flow of the liquid to the flow region. The supply system of the plasma arc torch system can include a pressure regulator coupled to the liquid supply conduit for regulating a liquid pressure value associated with a flow of the liquid in the liquid supply conduit. The supply system can include a flow valve disposed between the liquid source and the torch along the liquid supply conduit. The flow valve is configured to regulate a flow rate of the flow of the liquid in the liquid supply conduit. The supply system can include a flow meter disposed between the liquid source and the torch along the liquid supply conduit. The flow meter is configured to measure a flow rate of the flow of the liquid in the liquid supply conduit. The plasma arc torch system can further include a gas supply conduit configured to supply a shield gas from a gas source to the flow region and a shield fluid conduit formed by joining the gas supply conduit and the liquid supply conduit downstream from the activation valve. The shield fluid conduit is configured to convey one of the shield gas from the gas supply conduit or the liquid from the liquid supply conduit to the flow region depending on an operator selection.

In some embodiments, the plasma arc torch system further comprises a supply system that includes a liquid supply conduit for conducting the liquid from a liquid source to the torch, a pressure regulator coupled to the liquid supply conduit, a flow valve disposed between the liquid source and the torch along the liquid supply conduit, and an activation valve disposed between the liquid source and the torch along the liquid supply conduit. The pressure regulator is configured to regulate a liquid pressure value associated with a flow of the liquid in the liquid supply conduit. The flow valve is configured to regulate a flow rate of the flow of the liquid in the liquid supply conduit. The activation valve is configured to enable or disable the flow of the liquid to the flow region. The supply system can also include an optional flow meter configured to measure the flow rate of the flow of the liquid in the liquid supply conduit.

In some embodiments, the plasma arc torch system further comprises a supply system that includes a liquid supply conduit for conducting the liquid from a liquid source to the torch, a pressure regulator coupled to the liquid supply conduit and an activation valve disposed between the liquid source and the torch along the liquid supply conduit. The pressure regulator is configured to regulate a liquid pressure value associated with a flow of the liquid in the liquid supply conduit. The activation valve is configured to enable or disable the flow of the liquid to the flow region. The supply system can also include an optional flow meter configured to measure a flow rate of the flow of the liquid in the liquid supply conduit.

In some embodiments, the plasma arc torch system further comprises a supply system that includes a liquid supply conduit for conducting the liquid from a liquid source to the torch, a flow valve disposed between the liquid source and the torch along the liquid supply conduit, an activation valve disposed between the liquid source and the torch along the liquid supply conduit, and a flow meter disposed between the liquid source and the torch along the liquid supply conduit. The flow valve is configured to regulate a flow rate of a flow of the liquid in the liquid supply conduit. The activation valve is configured to enable or disable the flow of the liquid to the flow region. The flow meter is configured to measure the flow rate of the flow of the liquid in the liquid supply conduit.

In some embodiments, the vent passage has an inlet located upstream from the nozzle exit orifice. In some embodiments, the shield exit orifice is substantially aligned with the nozzle exit orifice to define a conduit for expelling the liquid, the plasma arc and an unionized portion of the plasma gas.

In some embodiments, the nozzle exit orifice is configured to constrict the plasma arc exiting the plasma chamber to the flow region via the nozzle exit orifice. In some embodiments, the vent passage in the nozzle and the liquid in the flow region provide constriction on the plasma arc. The swirling motion of the plasma gas can further constrict the plasma arc.

In another aspect, a method is provided for operating a plasma arc torch to cut a workpiece. The method includes passing a plasma gas to a plasma chamber in the torch defined by an electrode and a nozzle, ionizing a first portion of the plasma gas to form a plasma arc in the plasma chamber, and venting a second portion of the plasma gas via at least one vent passage disposed in the nozzle. The method also includes passing the plasma arc from the plasma chamber to a flow region via a nozzle exit orifice. The flow region is defined by the nozzle and a shield. The method further includes supplying a liquid to the flow region via a conduit located between the nozzle and the shield and directing the liquid from the conduit to substantially surround the plasma arc.

In some embodiments, ionizing the first portion of the plasma gas further comprises passing a current between the electrode and the nozzle.

In some embodiments, constriction of the plasma arc is provided by at least one of i) the venting, ii) the nozzle exit orifice before the plasma arc passes to the flow region, iii) the liquid that substantially surrounds the plasma arc in the shield exit orifice, or iv) the swirling motion of the plasma gas.

In some embodiments, the method further includes shearing, by the liquid, in a liquid or vapor state, molten material away from a workpiece being processed by the plasma arc. The method can further include reducing, by the liquid, a heat affected zone generated during processing of a workpiece by the plasma arc.

In yet another aspect, a plasma arc torch is provided that includes a torch body and a tip assembly connected to the torch body. The tip assembly includes an electrode, a nozzle disposed about the electrode, and a shield disposed about the nozzle. The nozzle includes (1) a nozzle exit orifice and (2) a vent conduit having an inlet located upstream from the nozzle exit orifice. The shield includes a shield exit orifice. The nozzle and the shield define a flow region therebetween, where the flow region is shaped to expel a liquid along with a plasma arc that is substantially surrounded by the liquid through the shield exit orifice.

In some embodiments, the plasma arc torch further includes a supply system in fluid communication with the flow region. In some embodiments, the shield comprises a conduit for receiving the liquid and introducing the liquid to the flow region. In some embodiments, constriction of the plasma arc is provided by at least one of the nozzle exit orifice, the venting, the liquid as the plasma arc passes via the shield exit orifice or the swirling motion of the plasma gas.

In other examples, any of the aspects above can include one or more of the following features. In some embodiments, the plasma gas is at least one of nitrogen, F5 or air. In some embodiments, the liquid is water. In some embodiments, a combination of the electrified ionized plasma gas and the liquid produces hydrogen.

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
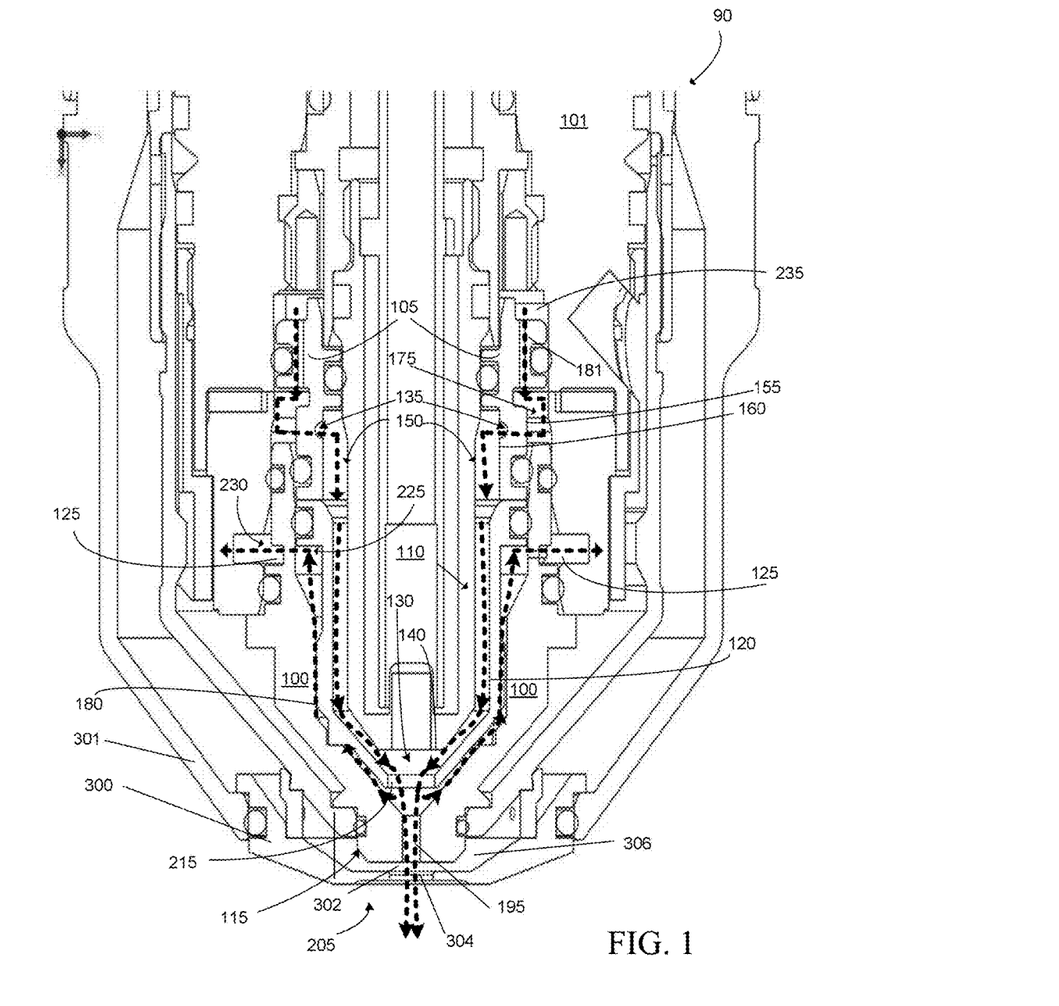
FIG. 1 shows an exemplary plasma arc torch, according to some embodiments of the present technology.

FIG. 1 shows an exemplary plasma arc torch, according to some embodiments of the present technology. A plasma arc torch can include a torch body 101 and a tip assembly 90 connected to the torch body 101. The tip assembly 90 can include a nozzle 100, a swirl ring 105, an electrode 110, and a plasma chamber 130. The torch defines a distal end 205, which is the end that is positioned closest to a workpiece (not shown) during torch operation. The electrode 110 has a distal end face 140 and an exterior surface 150. The plasma chamber 130 is defined, at least in part, by the distal end face 140 of the electrode 110 and the nozzle 100, which is situated in a spaced relationship from the electrode 110. The plasma chamber 130 is configured to receive a plasma gas.

The nozzle 100 includes a body 115, a liner 120 disposed within the body 115, and at least one plasma gas vent passage 125 formed in the body 115. The body 115 of the nozzle 100 can have a nozzle exit orifice 195 at the distal end 205. The liner 120 can include a liner exit orifice 215 between a distal end face of electrode 140 and the nozzle exit orifice 195 (e.g., at distal end 205 adjacent nozzle exit orifice 195). In some embodiments, the diameter of the nozzle exit orifice 195 is reduced to produce high-current densities and better plasma-arc constriction to promote enhanced cut quality and cutting speed.

The vent passage 125 in the nozzle 100 can have an inlet 225 and an outlet 230. In some embodiments, the vent passage 125 is a vent hole. The vent passage 125 is in fluid communication with a venting channel 180 disposed in the nozzle 100. The venting channel is configured to direct a portion of a plasma gas exiting the plasma chamber 130, from between the liner exit orifice 215 and the nozzle exit orifice 195 to the plasma gas vent passage 125 of the nozzle 100. The plasma gas vent passage 125 can be disposed adjacent the venting channel 180 and with the inlet 225 and the outlet 230 positioned upstream from the nozzle exit orifice 195.

The swirl ring 105 is in fluid communication with the plasma chamber 130. The swirl ring 105 has an exterior surface 155, an interior surface 160, at least one proximal inlet gas opening 235, and at least one distal outlet gas port 135 (e.g., a swirl injection point, swirl hole, etc.). The exterior surface 155 of the swirl ring 105 and interior surface of the torch body 101 can define at least in part an inner gas chamber 175. The proximal inlet gas opening 235 can extend to the inner gas chamber 175 to provide a gas to the inner gas chamber 175. The inner gas chamber 175 can be in fluid communication with the distal outlet gas port 135 to provide the gas from the inner gas chamber 175 to the plasma chamber 130 and generate a substantially swirling gas flow in the plasma chamber 130.

The torch of FIG. 1 can also include a shield 300 spaced from the nozzle 100. The shield 300 includes a shield exit orifice 304 in fluid communication with the nozzle exit orifice 195. The shield exit orifice 304 can be substantially aligned and coaxial with the nozzle exit orifice 195 to define a flow region 302 therebetween. The shield 300 can also include a liquid passageway 306 between the nozzle 100 and the shield 300 that allows a shield liquid (e.g., water) to be introduced into the flow region 302. In some embodiments, the shield liquid may be introduced into flow region 302 via an opening (not shown) disposed in the body of the shield, where the opening is in fluid communication with the passageway 306. Specifically, the liquid passageway 306 is defined by an external surface of the nozzle body 115 and an internal surface of the shield 300. In some embodiments, the liquid passageway is defined by an external surface of the nozzle body 115 and an internal surface of the shield cap 301.

FIG. 1 also shows a plasma gas flow path 181, according to some embodiments of the present technology. Exemplary plasma gas includes at least one of nitrogen, F5 or air. The plasma gas is introduced into the torch through the inlet gas opening 235 (e.g., metering or distribution holes) of the swirl ring 105 into the inner gas chamber 175. The plasma gas is directed to the distal outlet gas port 135 that provides the gas from the inner gas chamber 175 to the plasma chamber 130. The distal outlet gas port 135 can generate a substantially swirling gas flow in the plasma chamber 130.

During torch operation, a portion of the plasma gas in the plasma chamber 130 can be ionized by an electrical current provided to the electrode 110, which acts as a cathode, and the nozzle 100, which acts as an anode, to generate a plasma arc in the plasma chamber 130. An electric arc that is formed between the electrode 110 and the nozzle 100 in the plasma chamber 130 can generate high heat that in turn ionizes at least a portion of the plasma gas introduced by the distal outlet gas port 135. The electric arc and the ionized gas constitute the plasma arc (i.e., an ionized gas jet). The plasma arc can be applied to a workpiece to mark, cut, or otherwise operate on the workpiece when the arc is expelled from the gas chamber 130 to the flow region 302 via the nozzle exit orifice 195 and from the flow region 302 to the outside via the shield exit orifice 304.

In some embodiments, a portion of the plasma gas introduced by the distal outlet gas port 135 into the plasma chamber 130 can remain in its unionized form (i.e., not ionized by the electric arc to form a part of the plasma arc). Hereinafter, this portion of the plasma gas is referred as a unionized plasma gas. The unionized plasma gas can be expelled, along with the plasma arc, from the gas chamber 130 to the flow region 302 via the nozzle exit orifice 195 and from the flow region 302 to the outside via the shield exit orifice 304.

In some embodiments, the swirling motion of the plasma gas provided by the swirl ring 105 stabilizes the plasma arc inside of the plasma chamber 130. In particular, as the plasma gas rotates in plasma chamber 130, the hotter, lighter portion of the plasma gas remains near the center of the plasma chamber 130, while the cooler, heavier portion of the plasma gas is driven to the outer walls of the chamber 130 by centrifugal force. Such temperature gradients generate a thermal pinch. In addition, the swirling plasma gas generates higher pressure along the outer wall of the plasma chamber 130 and lower pressure at the center, thus creating a pressure gradient in the chamber 130 to squeeze the plasma arc, thereby creating a pressure pinch that constricts the plasma arc in the plasma chamber 130, which can improve cut performance. Arc constriction is also provided by thermal considerations governed by the size of the emitter in the electrode 110 and the cooling of the emitter. In addition, using a nozzle exit orifice with a small diameter, which expels only a small fraction of the plasma gas from the plasma chamber 130 to the flow region 302, further enhances constriction on the plasma arc.

As shown by the plasma gas flow path 181, after the plasma arc and/or the unionized plasma gas exit the plasma chamber 130, a portion of the unionized gas can be diverted through the venting channel 180, to cool the nozzle 100, and directed to at least one vent gas passage 125 in the nozzle 100. In some embodiments, the vented gas can be directed through the venting channel 180, passing between the liner 120 and the nozzle body 115 (e.g., nozzle shell). Then, the vented gas can pass through the gas vent passage 125 (e.g., metering holes, vent holes, etc.) to a torch vent gas conduit and out to ambient atmosphere. In some embodiments, the venting provided by the venting channel 180 and the gas vent passage 125 constricts the plasma arc upstream of the nozzle exit orifice 195 between the liner 120 and the nozzle body 115. In addition, the venting via vent gas passage 125 can promote cooling of the nozzle 100.

Figure 2:
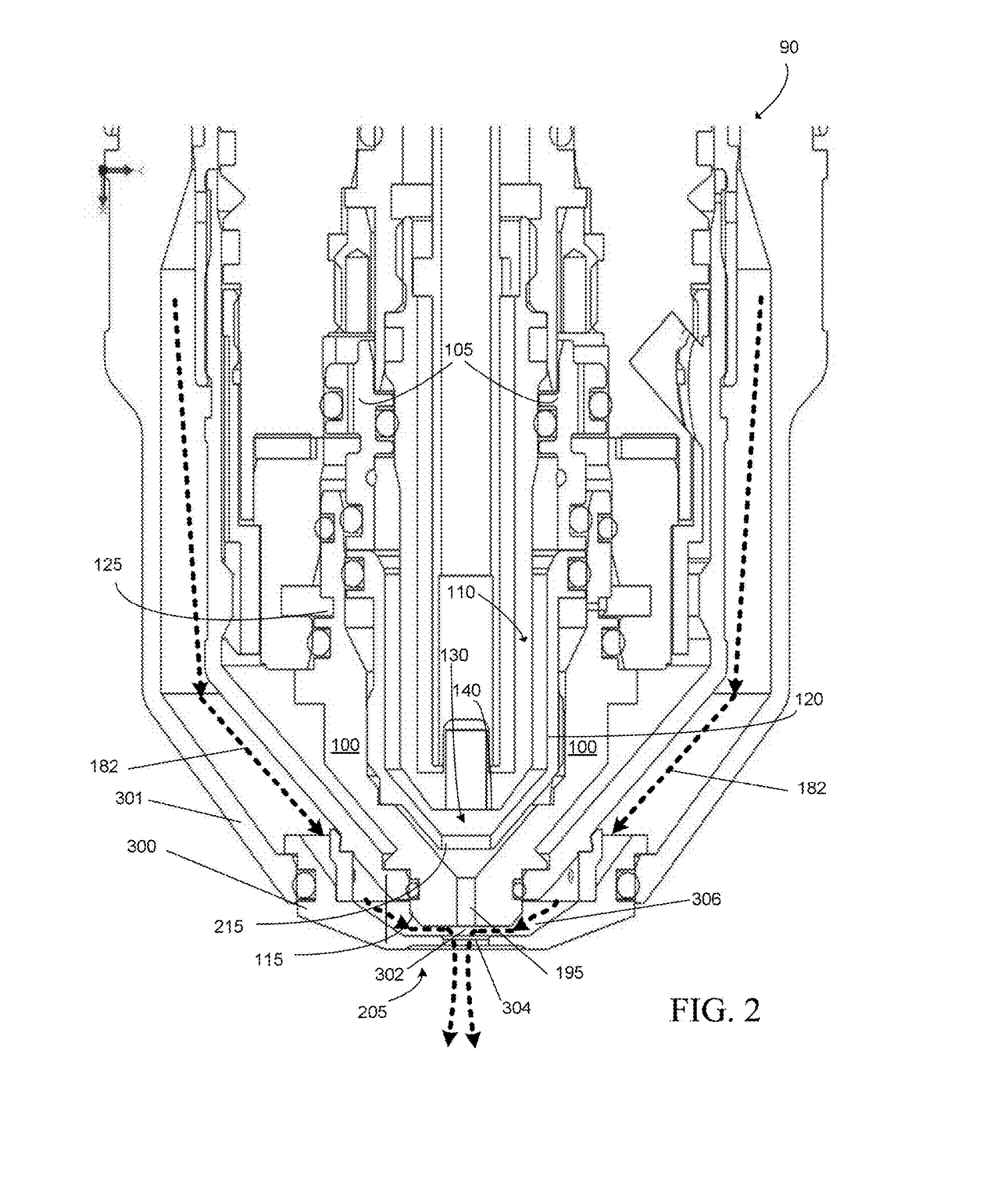
FIG. 2 shows an exemplary shield liquid flow path, according to some embodiments of the present technology.

FIG. 2 shows an exemplary shield liquid flow path 182, according to some embodiments of the present technology. The configuration of the plasma arc torch of FIG. 2 is substantially the same as that the plasma arc torch of FIG. 1. The shield liquid can comprise water, for example. As shown, the shield liquid is introduced into the torch through an opening (not shown) disposed in the body of the shield 300. The shield liquid can flow into the liquid passageway 306 that is in fluid communication with the opening. The shield liquid is directed by the liquid passageway 306 to the flow region 302 situated between the nozzle exit orifice 195 and the shield exit orifice 304. The flow region 302 can expel the shield liquid out of the torch via the shield exit orifice 304. In some embodiments, a lower shield swirl strength is used with shield liquids (e.g. water) in comparison to the use of shield gases in the same cutting process In some embodiments, the shield liquid impinges on the plasma arc and/or unionized plasma gas that are ejected by the nozzle exit orifice 195 from the plasma chamber 130. The shield liquid can substantially surround the plasma arc. In some embodiments, the shield liquid constricts the plasma arc as the liquid and the arc pass through the shield exit orifice 304. The use of a shield liquid is advantageous because at a high flow rate, a shield gas is compressible, while a shield liquid is not. Therefore, higher constriction of the plasma arc can be achieved with shield liquid as opposed to shield gas. In addition, a dense shield liquid, such as water, provides even better constriction. There are additional advantages associated with using water as a shield fluid. For example, as water comes into contact with high temperature plasma, a portion of it decomposes into oxygen and hydrogen, where the hydrogen interacts with the plasma cutting process to give the kerf of a cut a color closer to that of the base material in comparison to a cut made with cutting processes using nitrogen or air plasma gas in combination with nitrogen or air shield gas. In addition, water, being a denser matter compared to a gas, helps in shearing (e.g., pushing) molten metal away from the workpiece being cut. This results in a smooth, dross-free cut. Furthermore, using water as a shield fluid reduces the heat that can spread into the workpiece, thereby reducing the extent of heat affected zone.

Figure 3:
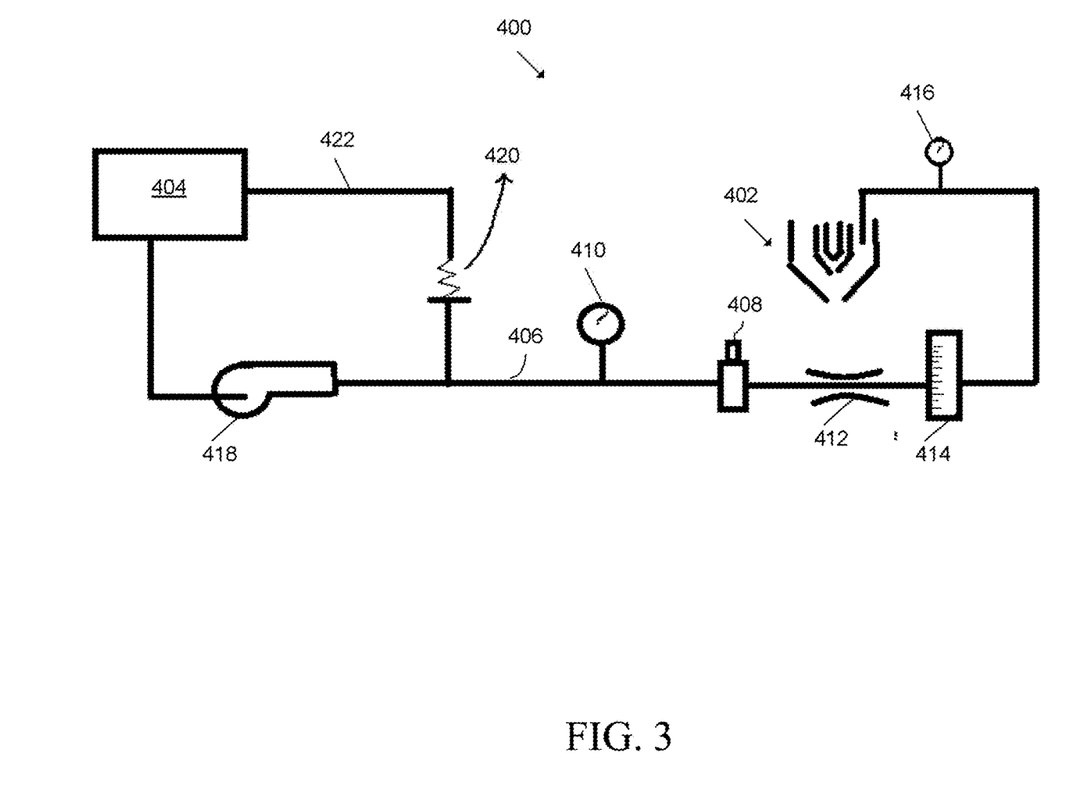
FIG. 3 shows an exemplary shield fluid supply system, according to some embodiments of the present technology.

FIG. 3 shows an exemplary shield fluid supply system, according to some embodiments of the present technology. The supply system 400 can deliver a shield liquid, such as water, to a plasma arc torch 402, which can be substantially the same as the torch of FIGS. 1 and 2. As shown, the supply system 400 includes a liquid source 404 and a liquid supply conduit 406. The liquid source 404 can be a container (e.g., a tank) for storing a supply of shield liquid, such as water. The liquid supply conduit 406 can be configured to conduct the liquid from the liquid source 404 to the torch 402. For example, the liquid supply conduit 406 can be in fluid communication with the liquid passageway 306 to introduce the shield liquid to the flow region 302. A set of pump and motor 418 can be connected between the liquid source 404 and the torch 402 along the liquid supply conduit 406 to mechanically pass the shield liquid through the conduit 406. In some embodiments, a bypass release valve 420 is connected between the liquid source 404 and the torch 402 and in parallel to the pump and motor set 418 to establish a bypass path 422. As an example, for a 130-ampere process, the water pressure can be about 40 pounds per square inch (PSI) at a flow rate of 14 gallons per hour. As another example, for a 60-ampere process, the water pressure can be about 40 PSI at a flow rate of 12 gallons/hour. The bypass release valve 420 acts as a relief valve by returning, if needed, all or part of the liquid discharged by the pump and motor set 418 back to either the liquid source 404 or the inlet of the pump. This is done to protect the pump and any associated equipment from excessive liquid pressure. The bypass release valve 420 and the bypass path 422 can be internal (an integral part of the pump and motor set 418) or external (i.e., installed as a separate component in the fluid path).

In addition, one or more components can be coupled to the liquid supply conduit 406 to regulate properties associated with the supply of the shield liquid from the source 404 to the torch 402. For example, an activation valve 408 (e.g., a solenoid valve) can be coupled to the liquid supply conduit 406 and disposed between the liquid source 404 and the torch 402 to enable or disable a flow of the liquid to the torch 402. A pressure gauge 416 can be coupled to the liquid supply conduit 406 to measure the liquid pressure associated with a flow of the shield liquid in the liquid supply conduit 406. A pressure regulator 410 can be coupled to the liquid supply conduit 406 to regulate the liquid pressure associated with a flow of the shield liquid in the liquid supply conduit 406, such as by increasing or decreasing the liquid pressure to achieve a desired pressure value. A flow meter 414 can be disposed between the liquid source 404 and the torch 402 along the liquid supply conduit 406 to measure a flow rate of the flow of the liquid in the liquid supply conduit 406. A flow valve 412 (e.g., a needle valve) can be coupled to the liquid supply conduit 406 to regulate a flow rate of the flow of the liquid in the liquid supply conduit 406, such as by increasing or decreasing the liquid flow rate to achieve a desired flow rate.

Among the components that can be coupled to the liquid supply conduit 406 to regulate various liquid supply properties, the supply system 400 can include a set comprising the pressure regulator 410, the flow valve 412, the activation valve 408 and the flow meter 414 (optional) in one exemplary configuration. In another exemplary configuration, the supply system 400 includes the pressure regulator 410, the activation valve 408, and the flow meter 414 (optional). In yet another exemplary configuration, the supply system 400 includes the flow valve 412, the activation valve 408 and the flow meter 414.

Figure 4:
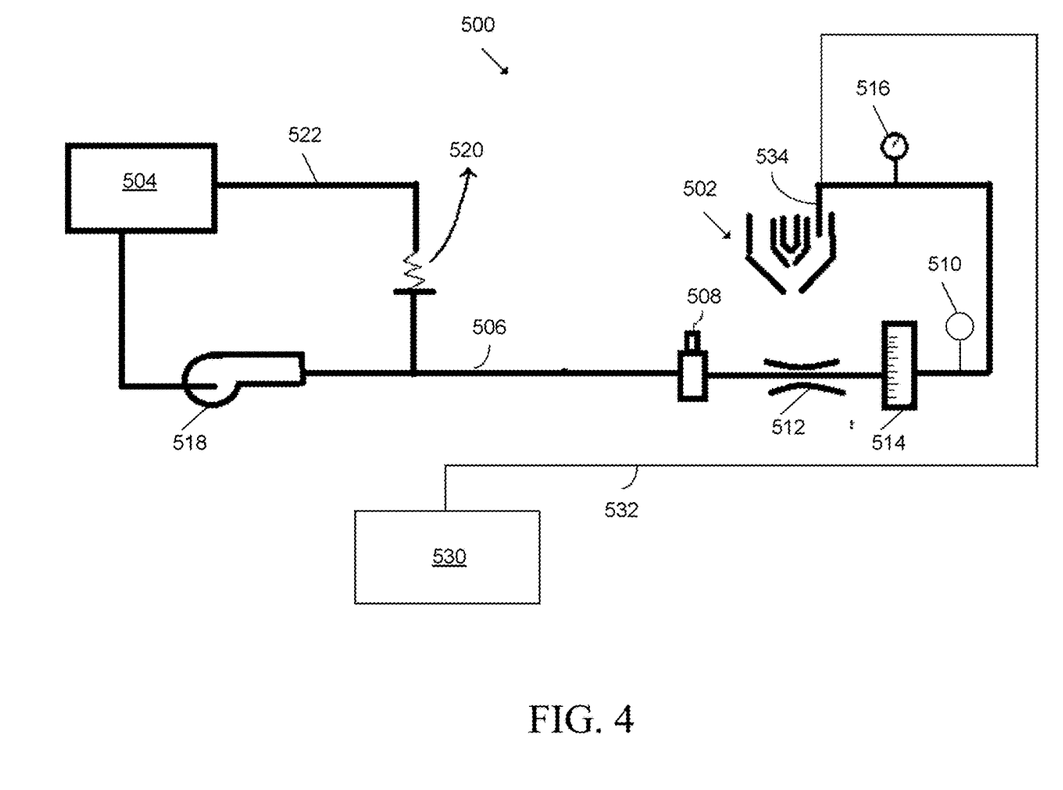
FIG. 4 shows another exemplary shield fluid supply system, according to some embodiments of the present technology.

FIG. 4 shows another exemplary fluid supply system of the present technology. The supply system 500 can deliver a shield liquid (e.g. water) or a shield gas (e.g., nitrogen) to a plasma arc torch 502 using an activation valve 508. The plasma arc torch can be substantially the same as the torch of FIGS. 1 and 2. As shown, the supply system 500 includes a liquid source 504 and a liquid supply conduit 506 that is configured to conduct a liquid from the liquid source 504 to the activation valve 508. The liquid supply conduit 506 and the liquid source 504 can be substantially the same as the liquid supply conduit 406 and the liquid source 404 of FIG. 3, respectively. In addition, the supply system 500 can include a set of pump and motor 518 connected between the liquid source 504 and the activation valve 508 along the liquid supply conduit 506 and a bypass release valve 520 in parallel to the pump and motor set 518 to establish a bypass path 522. These components can function substantially the same as their counterpart components of FIG. 3. In some embodiments, a shield liquid from a traditional liquid supply source, such as water supplied by public utilities, can be delivered to a plasma arc torch, instead of using a reservoir and a pump.

The supply system 500 also includes a gas supply system 530 (e.g., a gas selection console, a metering console, a gas source, etc.) and a gas supply conduit 532 that is configured to conduct a gas (e.g., $N_2$ or air) from the gas supply system 530 to the activation valve 508. The supply system 500 further includes a shield fluid conduit 534 formed by joining the gas supply conduit 532 and the liquid supply conduit 506 downstream from the activation valve 508 (e.g., liquid metering equipment). Upon a user selection from a computerized console (not shown) coupled to the supply system 500, the activation valve 508 can allow either (i) allow the shield liquid to flow from the liquid source 504 through the liquid supply conduit 506 to the torch 502 via the fluid supply conduit 534, if a shield liquid is selected by the user, or (ii) shut off the liquid flow to allow the shield gas from the gas supply system 530 to flow from the gas supply conduit 532 to the torch 502 via the fluid supply conduit 534, if a shield gas is selected by the user. Hence, the shield fluid conduit 534 can convey one of the shield gas from the gas supply conduit 532 or the shield liquid from the liquid supply conduit 506 to the flow region 302 of the torch 502 depending on an operator selection.

In addition to the activation valve 508, one or more components can be coupled to the shield liquid conduit 506 to regulate properties associated with the supply of the shield liquid to the torch 502. For example, a pressure gauge 516 can be coupled to the liquid supply conduit 506 to measure the pressure associated with a flow of the shield liquid in the shield liquid conduit 506. A pressure regulator 510 can be coupled to the shield liquid conduit 506 to regulate the pressure associated with a flow of the shield liquid in the shield liquid conduit 506, such as by increasing or decreasing the pressure to achieve a desired pressure value. A flow meter 514 can be coupled to the shield liquid conduit 506 to measure a flow rate of the flow of the liquid in the shield liquid conduit 506. A flow valve 512 (e.g., a needle valve) can be coupled to the shield liquid conduit 506 to regulate a flow rate of the flow of the liquid in the shield liquid conduit 506, such as by increasing or decreasing the liquid flow rate to achieve a desired flow rate.

Among the components that can be coupled to the shield liquid conduit 506 to regulate various liquid supply properties, the supply system 500 can include a set comprising the pressure regulator 510, the flow valve 512, the activation valve 508 and the flow meter 514 (optional) in one exemplary configuration. In another exemplary configuration, the supply system 500 includes the pressure regulator 510, the activation valve 508, and the flow meter 514 (optional). In yet another exemplary configuration, the supply system 500 includes the flow valve 512, the activation valve 508 and the flow meter 514.

Figure 5:
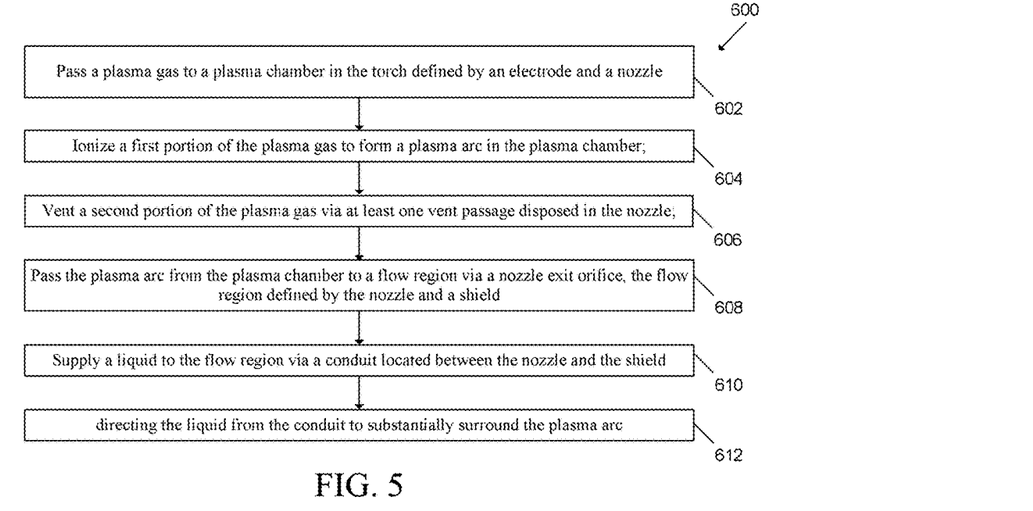
FIG. 5 shows an exemplary method for operating the plasma arc torch of FIGS. 1 and 2.

FIG. 5 shows an exemplary method for operating the plasma arc torch of FIGS. 1 and 2. As shown, the method 600 starts when a plasma gas is passed to a plasma chamber in the plasma arc torch (step 602). The plasma gas can be introduced into the torch through the inlet gas opening 235 of the swirl ring 105 into the inner gas chamber 175. The plasma gas is then directed to the distal outlet gas port 135 that provides the gas from the inner gas chamber 175 to the plasma chamber 130. In some embodiments, the distal outlet gas port 135 can generate a substantially swirling plasma gas flow in the plasma chamber 130.

Once the plasma gas reaches the plasma chamber 130, a first portion of the plasma gas is ionized to form a plasma arc in the plasma chamber 130 (step 604). In some embodiments, another portion of the plasma gas in the plasma chamber 130 can remain in its unionized form as an unionized plasma gas. As the plasma arc and/or the unionized plasma gas is expelled from the plasma chamber 130 via the nozzle exit orifice 195, a portion of the plasma gas can be diverted through the venting channel 180 and directed to at least one vent gas passage 125 in the nozzle 100 (step 606).

The plasma arc, along with the unionized plasma gas, can be expelled from the gas chamber 130 to the flow region 302 via the nozzle exit orifice 195 (step 608), where the flow region 302 is situated between the nozzle 100 and the shield 300. A shield liquid can be supplied to the flow region 302 via a passageway 306 located between the nozzle 100 and shield 300 using, for example, the fluid supply system 400 of FIG. 3 or the fluid supply system 500 of FIG. 4 (step 610). The flow region 302 can expel the shield liquid, along with the plasma arc and/or the unionized plasma gas, to the outside via the shield exit orifice 304. The shield liquid can form a column about the plasma arc and/or the unionized plasma gas to substantially surround them as they are ejected via the shield exit orifice 304 (step 612). In some embodiments, constriction on the plasma arc can be provided by at least one of (i) the swirling motion of the plasma gas in the plasma chamber 130, (ii) the nozzle exit orifice 195 as the plasma arc exits therethrough, (iii) the shield liquid as it surrounds the plasma arc when passing through the shield exit orifice 304 and (iv) the venting of the unionized plasma gas provided by the venting channel 180.

Figure 6:
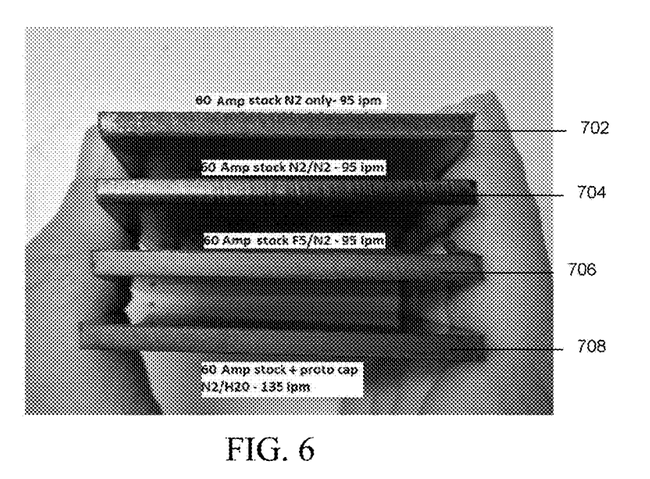
FIG. 6 shows cut results on exemplary stainless steel workpieces using the systems and methods described above with reference to FIGS. 1-5.

FIG. 6 shows cut results on exemplary stainless steel workpieces using the systems and methods described above with reference to FIGS. 1-5. Cutting is performed on four 10-gauge stainless steel workpieces using a plasma arc torch operated at a current of 60 ampere and vented through the nozzle. The plasma arc torch, similar to the torch of FIGS. 1 and 2, is equipped with a set of consumables including an electrode, a swirl ring, a nozzle and a shield. For the first workpiece 702, the cutting process uses only nitrogen ($N_2$) as the plasma gas and no shield fluid. For the second workpiece 704, the cutting process uses $N_2$ as both the plasma gas and shield gas. For the third workpiece 706, the cutting process uses a mixture of 95% nitrogen and 5% hydrogen (F5) as the plasma gas and $N_2$ as the shield gas. For the fourth workpiece 708, the cutting process uses $N_2$ as the plasma gas and water ($H_2O$) as the shield liquid. In addition, the plasma arc torch is equipped with a cap having 18×0.0156 diameter holes (i.e., 18 holes of 0.0156 inch diameter) and a 0.040 inch counterclockwise offset during the cutting process.

As shown, by using a liquid (i.e., water) as the shield fluid and $N_2$ as the plasma gas, the fourth workpiece 708 has better cut appearance compared to the first workpiece 702 or the second workpiece 704, where the edge of the cut is close to the base metal color and dross free. The fourth workpiece 708 shows similar cut appearance to the third workpiece 706. The superior cut achieved by the fourth workpiece 708 is obtained at a higher cut speed in comparison to the cutting speed of the other workpieces. For example, a 50% increase in speed is achieved in the cutting of the fourth workpiece 708 using the $N_2/H_2O$ combination in comparison to the cutting of other workpieces. Specifically, the cutting speed is increased from 95 inches per minute ("ipm") to 135 ipm.

In addition, it is evident from the third workpiece 706 that at least some of the hydrogen in the F5 plasma gas interacts with the shield gas $N_2$ to impart a silver-like color to the cut edge. In the $N_2/H_2O$ process as reflected by the fourth workpiece 708, at least some of the hydrogen from water and/or vapor of the shield liquid can interact with the $N_2$ plasma gas to give the cut edge an appearance and color closer to the base metal. In contrast, for the $N_2/N_2$ process as reflected by the second workpiece 702, the cut edge is much darker, which is indicative of nitride formation.

Figure 7:
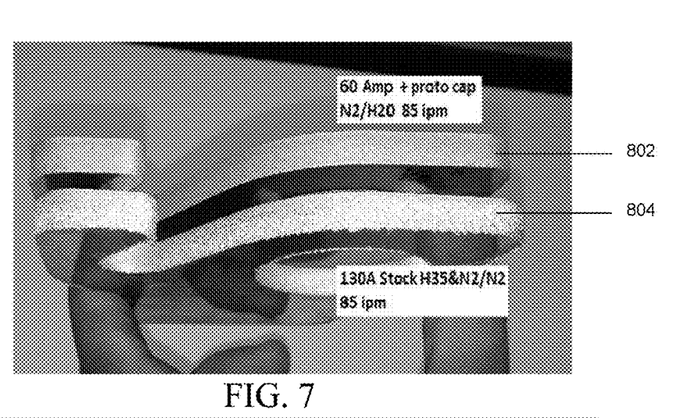
FIG. 7 shows cut results on exemplary aluminum workpieces using the systems and methods described above with reference to FIGS. 1-5.

FIG. 7 shows cut results on exemplary aluminum workpieces using the systems and methods described above with reference to FIGS. 1-5. Cutting is performed on two ¼-in thick aluminum workpieces using a plasma arc torch, equipped with a set of consumables including an electrode, a swirl ring, a nozzle and a shield. For the first workpiece 802, the plasma arc torch is vented, the cutting process applies a cutting current of 60 ampere, and the cutting process uses $N_2$ as the plasma gas and water as the shield liquid. In addition, the plasma arc torch is equipped with a cap having 18×0.0156 diameter holes (i.e., 18 holes of 0.0156 inch diameter) and a 0.040 inch counterclockwise offset during the cutting process. For the second workpiece 804, the plasma arc torch is not vented, the cutting process applies a cutting current of 130 ampere, and the cutting process uses a mixture of 35% hydrogen and 65% argon (H35) and $N_2$ as the plasma gas and $N_2$ as the shield gas. As shown, using water as shield fluid, combined with vented nozzle, provides better cut quality on an aluminum workpiece (e.g., the workpiece 802) than a gas as shield fluid with non-vented nozzle. In addition to a significant cutting speed increase (i.e., same speed for half the amperage), the appearance of the cut edge for the workpiece 802 is far better (i.e., smoother and cleaner) in comparison to the workpiece 804, which is cut by a non-vented, 130 ampere process that uses a combination of H35 & N2 as plasma gas and N2 as shield gas.

Figure 8:
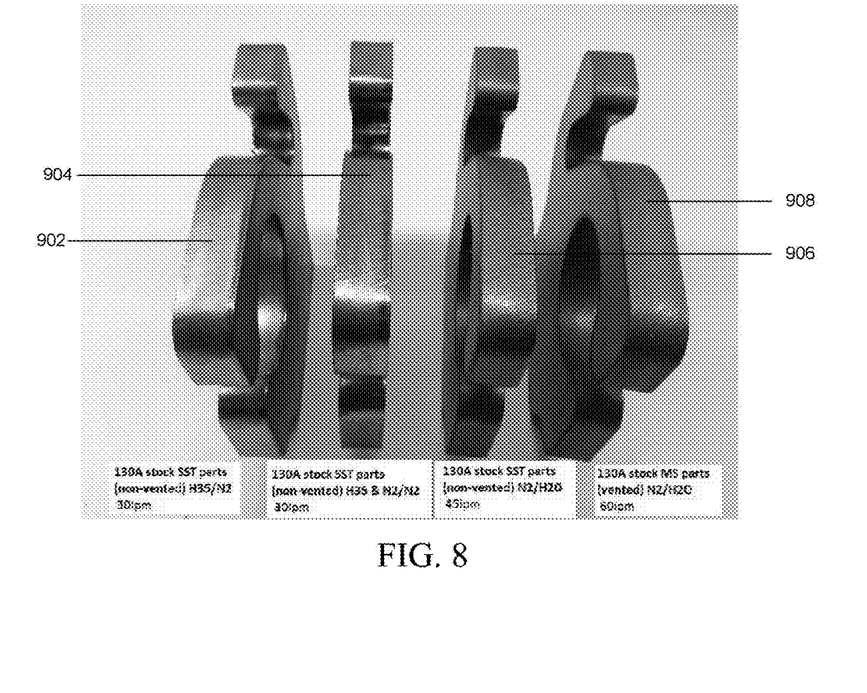
FIG. 8 shows cut results on another set of stainless steel workpieces using the systems and methods described above with reference to FIGS. 1-5.

FIG. 8 shows cut results on another set of stainless steel workpieces using the systems and methods described above with reference to FIGS. 1-5. Cutting is performed on four ½-inch thick stainless steel workpieces using a plasma arc torch operated at 130 ampere. The plasma arc torch is equipped with a set of consumables including an electrode, a swirl ring, a nozzle and a shield, similar to the torch of FIGS. 1 and 2. To cut the first workpiece 902, the plasma arc torch is not vented. The cutting process uses H35 as the plasma gas and $N_2$ as the shield gas with a cutting speed of 30 ipm. To cut the second workpiece 904, the plasma arc torch is not vented. The cutting process uses a combination of H35 and $N_2$ as the plasma gas and $N_2$ as the shield gas with a cutting speed of 30 ipm. To cut the third workpiece 906, the plasma arc torch is not vented. The cutting process uses $N_2$ as the plasma gas and $H_2O$ as the shield gas with a cutting speed of 45 ipm. To cut the fourth workpiece 908, the plasma arc torch is vented. The cutting process uses $N_2$ as the plasma gas and $H_2O$ as the shield gas with a cutting speed of 60 ipm. As shown, there is a 50% cutting speed gain between the non-vented process where water is used as a shield fluid (e.g., represented by the third workpiece 906) and the non-vented processes where a gas is used as a shield fluid (e.g., represented by the first workpiece 902 and the second workpiece 904). Furthermore, there is a 100% cutting speed gain between the vented process where water is used as a shield fluid (e.g., represented by the fourth workpiece 908) and the non-vented processes where a gas is used as a shield fluid (e.g., represented by the first workpiece 902 and the second workpiece 904). Hence, a vented process, in combination with using water as a shield fluid, provides superior cutting performance than a non-vented process and/or a process with gas as a shield fluid.

Figure 9A:
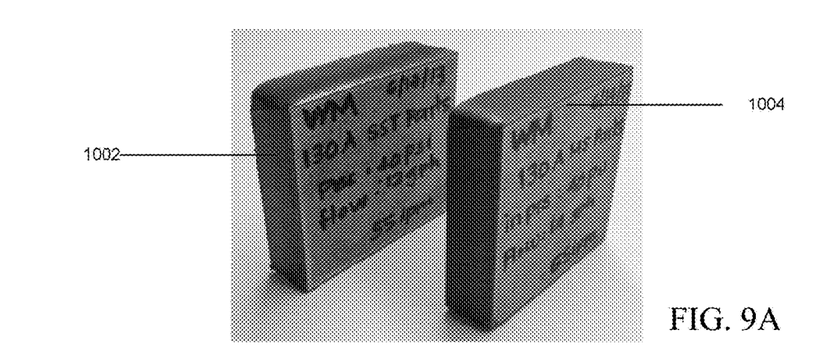
FIGS. 9A and B show various views of cut results on yet another set of stainless steel workpieces using the systems and methods described above with reference to FIGS. 1-5.
Figure 9B:
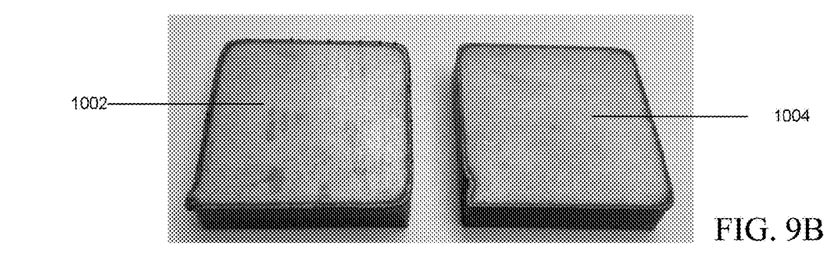

FIGS. 9A and B show various views of cut results on yet another set of stainless steel workpieces using the systems and methods described above with reference to FIGS. 1-5. Cutting is performed on two ½-inch thick stainless steel workpieces using a plasma arc torch operated at 130 ampere. The plasma arc torch is equipped with a set of consumables including an electrode, a swirl ring, a nozzle and a shield, similar to the torch of FIGS. 1 and 2. The plasma torch also uses $N_2$ as the plasma gas and $H_2O$ as the shield gas to process both workpieces. To cut the first workpiece 1002, the torch uses a non-vented nozzle with a cutting speed of 55 ipm. To cut the second workpiece 1004, the torch uses a vented nozzle with a cutting speed of 65 ipm. As shown, the workpiece 1004, which is cut by the vented process, is relatively clean and dross free in comparison to the workpiece 1002, which is cut by the non-vented process. In addition, the cutting speed for the vented process is faster in comparison to the cutting speed for the non-vented process due to better constriction of the plasma arc provided by the venting. Furthermore, cut performance is enhanced when a vented process is combined with using water as a shield fluid, the result of which is illustrated by the workpiece 1004. This is because the water/vapor produced by the shield liquid constitutes a denser medium, which assists in the effective removal of molten metal during cutting, thus resulting in a faster cut speed and cleaner cut surface.

Figure 10:
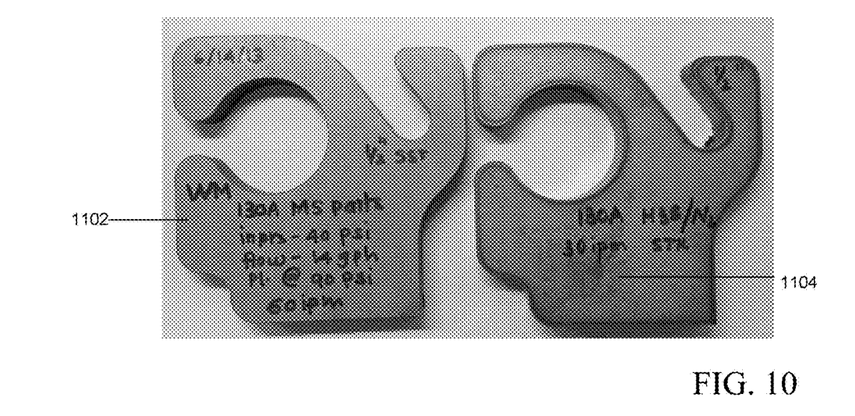
FIG. 10 shows cut results on yet another set of stainless steel workpieces using the systems and methods described above with reference to FIGS. 1-5.

FIG. 10 shows cut results on yet another set of stainless steel workpieces using the systems and methods described above with reference to FIGS. 1-5. Cutting is performed on two ½-inch thick stainless steel workpieces using a plasma arc torch operated at 130 A. The plasma arc torch is equipped with a set of consumables including an electrode, a swirl ring, a nozzle and a shield, similar to the torch of FIGS. 1 and 2. To cut the first workpiece 1102, the cutting process is vented, and the cutting process uses $N_2$ as the plasma gas and water as the shield liquid. To cut the second workpiece 1104, the cutting process is not vented, and the cutting process uses H35 as the plasma gas and $N_2$ as the shield gas. The first workpiece 1102 shows better cut quality (e.g., smoother cut edge) than the second workpiece 1104 due to the use of water as the shield fluid. In addition, because nitrogen and water are readily available in the industry and are relatively cheaper to obtain than other fuel materials (e.g., gases such as H35 or F5), the use of $N_2$ as the plasma gas and water as the shield liquid for cutting the first workpiece 1102 is cost effective. Hence, the operating cost associated with processing the first workpiece 1102 is significantly lower. In addition, the heat-affected zone in the first workpiece 1102 is significantly smaller in comparison to that of the second workpiece 1104, which uses nitrogen as the shield gas, as evident by the darkening near the edges of the second workpiece 1104.

In general, the cut results illustrated by FIGS. 6-10 show that the combination of shield gas venting plus using a liquid (especially water) shield fluid provides better cut performance characteristics in comparison to using venting or a shield liquid alone in a cutting process. For example, FIG. 6 shows that a vented process with water as shield fluid (workpiece 708) offers better cutting speed than a vented process with gas as shield fluid (workpieces 702, 704 and 706) and better cut edge appearance (e.g., compared to workpieces 702 and 704). Therefore, a vented process with water as shield fluid provides generally good quality cuts at a higher speed when compared to a vented process with gas as shield fluid. In addition, FIG. 8 shows that a vented process with water as shield fluid (workpiece 908) offers improved cutting speed and cut edge appearance than a non-vented process with water as shield fluid (workpiece 906). FIG. 8 further shows that a vented process with water as shield fluid (workpiece 908) performs better in terms of speed in comparison to a non-vented process with gas as shield fluid (workpieces 902 or 904) while maintaining similar cut appearances. Thus, unexpected superior cutting results can be achieved by using a combination of venting and a shield liquid in a cutting process.

Figure 11:
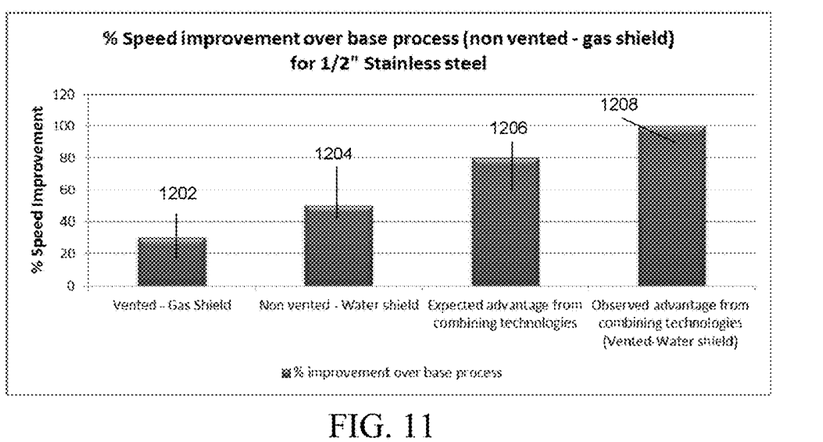
FIG. 11 shows a percentage speed improvement comparison chart for different processes.

FIG. 11 shows a percentage-speed improvement comparison chart for three different processes (with various combinations of venting and shield fluid usage) on aluminum workpieces of about the same quality. The comparison is based on the percentage of speed improvement of each process in relation to a base process, which is a non-vented process with gas as shield fluid. As shown, percentage improvement 1202 corresponds to a vented process with gas as shield fluid, percentage improvement 1204 corresponds to a non-vented process with water as shield fluid, percentage improvement 1206 corresponds to an expected improvement for a vented process with water as shield fluid, and percentage improvement 1208 corresponds to the actual improvement for the same vented process with water as shield fluid. As illustrated, using a combination of venting and a shield liquid (e.g., water) in a cutting process produces the largest speed improvement over the base process, as demonstrated by percentage improvement 1208, which is even higher than the expected improvement 1206.

Figure 12:
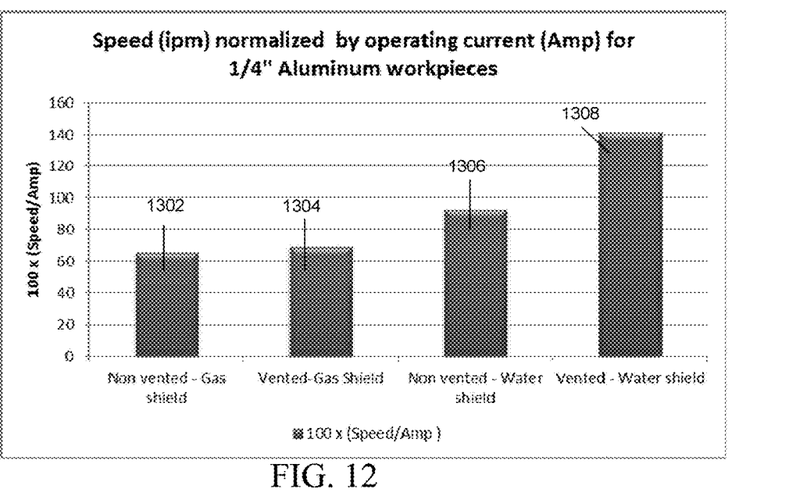
FIG. 12 shows a normalized cutting speed comparison chart for different processes.

FIG. 12 shows a cutting speed comparison chart for four different processes (with various combinations of venting and shield fluid usage) on stainless steel workpieces of about the same quality. The comparison is based on 100 times the measured speed of each process normalized by the operating current of the process. The speed can be in the unit of inches/minute. As shown, speed 1302 (e.g., a normalized speed) corresponds to a non-vented process with gas as shield fluid, normalized speed 1304 corresponds to a vented process with gas as shield fluid, normalized speed 1306 corresponds to a non-vented process with water as shield fluid, and normalized speed 1308 corresponds to a vented process with water as shield fluid. As illustrated, using a combination of venting and a shield liquid (e.g., water) in a cutting process produces the highest normalized cutting speed, as demonstrated by normalized speed 1308.

Figure 13:
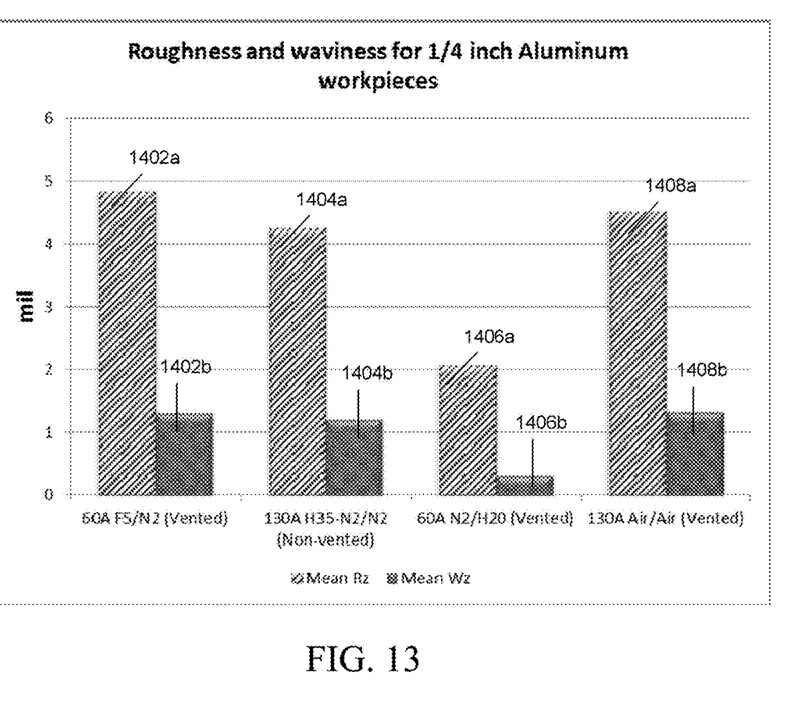
FIG. 13 shows a comparison of workpiece surface roughness and waviness produced by different processes.

FIG. 13 shows a comparison of workpiece surface roughness and waviness produced by four different processes (with various combinations of venting and shield fluid usage) on aluminum workpieces of about the same quality. As shown, values 1402a and 1402b correspond to mean Rz (mean height of roughness profile) and mean Wz (mean height of waviness profile), respectively, for a 60-ampere vented process with F5 as plasma gas and N2 as shield fluid. Values 1404a and 1404b correspond to mean Rz and mean Wz, respectively, for a 130-ampere non-vented process with H35 and N2 as plasma gas and N2 as shield fluid. Values 1406a and 1406b correspond to mean Rz and mean Wz, respectively, for a 60-ampere vented process with N2 as plasma gas and H2O as shield fluid. Values 1408a and 1408b correspond to mean Rz and mean Wz, respectively, for a 130-ampere vented process with air as both plasma gas and shield fluid. As illustrated, using a combination of venting and a shield liquid (e.g., water) in a cutting process produces the lowest surface roughness and waviness, as demonstrated by values 1406a and 1406b.

It should also be understood that various aspects and embodiments of the invention can be combined in various ways. Based on the teachings of this specification, a person of ordinary skill in the art can readily determine how to combine these various embodiments. In addition, modifications may occur to those skilled in the art upon reading the specification. The present application includes such modifications and is limited only by the scope of the claims.

What is claimed is:

1. A plasma arc torch system having a supply system including a liquid source for supplying a liquid, and a liquid supply conduit in fluid communication with a liquid passageway between a nozzle and a shield of a plasma arc torch to introduce the liquid from the liquid source to a flow region of a plasma arc torch, thereby surrounding the plasma arc with the liquid, the plasma arc torch including:
   an electrode;
   the nozzle spaced from the electrode to define a plasma chamber therebetween, the nozzle comprising a nozzle body, a nozzle exit orifice, and a vent outlet, wherein the plasma chamber is configured to receive a plasma gas;
   a vent passage disposed in the nozzle body configured to divert a portion of the plasma gas exiting the plasma chamber to the vent outlet, thereby constricting the plasma arc; and
   a shield spaced from the nozzle to define the liquid passageway and the flow region therebetween, the shield comprising a shield exit orifice in fluid communication with the nozzle exit orifice, wherein the liquid passageway is configured to receive the liquid and introduce the liquid having a liquid swirl strength to the flow region such that the liquid surrounds and constricts the plasma arc, and the flow region is configured to expel the liquid along with the plasma arc surrounded by the liquid at the shield exit orifice,
   wherein diverting the portion of the plasma gas by the vent passage in the nozzle and expelling the liquid at the shield exit orifice both provide constriction of the plasma arc.

2. The plasma arc torch system of claim 1, wherein the supply system further includes:
   an activation valve disposed between the liquid source and the torch along the liquid supply conduit, the activation valve configured to enable or disable a flow of the liquid to the flow region.

3. The plasma arc torch system of claim 2, wherein the supply system further comprises a pressure regulator coupled to the liquid supply conduit for regulating a liquid pressure value associated with the flow of the liquid in the liquid supply conduit.

4. The plasma arc torch system of claim 2, wherein the supply system further comprises a flow valve disposed between the liquid source and the torch along the liquid supply conduit, the flow valve configured to regulate a flow rate of the flow of the liquid in the liquid supply conduit.

5. The plasma arc torch system of claim 2, wherein the supply system further comprises a flow meter disposed between the liquid source and the torch along the liquid supply conduit, the flow meter configured to measure a flow rate of the flow of the liquid in the liquid supply conduit.

6. The plasma arc torch system of claim 2, further comprising:
   a gas supply conduit configured to supply a shield gas from a gas source to the flow region; and
   a shield fluid conduit formed by joining the gas supply conduit and the liquid supply conduit downstream from the activation valve, wherein the shield fluid conduit is configured to convey one of the shield gas from the gas supply conduit or the liquid from the liquid supply conduit to the flow region depending on an operator selection.

7. The plasma arc torch system of claim 1, wherein the supply system further includes:
- a pressure regulator coupled to the liquid supply conduit for regulating a liquid pressure value associated with a flow of the liquid in the liquid supply conduit;
- a flow valve disposed between the liquid source and the torch along the liquid supply conduit for regulating a flow rate of the flow of the liquid in the liquid supply conduit;
- an activation valve disposed between the liquid source and the torch along the liquid supply conduit for enabling or disabling a flow of the liquid to the flow region; and
- an optional flow meter configured to measure the flow rate of the flow of the liquid in the liquid supply conduit.

8. The plasma arc torch system of claim 1, wherein the supply system further includes:
- the liquid supply conduit for conducting the liquid from the liquid source to the torch;
- a pressure regulator coupled to the liquid supply conduit for regulating a liquid pressure value associated with a flow of the liquid in the liquid supply conduit;
- an activation valve disposed between the liquid source and the torch along the liquid supply conduit for enabling or disabling the flow of the liquid to the flow region; and
- an optional flow meter configured to measure a flow rate of the flow of the liquid in the liquid supply conduit.

9. The plasma arc torch system of claim 1, wherein the supply system further includes:
- a flow valve disposed between the liquid source and the torch along the liquid supply conduit for regulating a flow rate of a flow of the liquid in the liquid supply conduit;
- an activation valve disposed between the liquid source and the torch along the liquid supply conduit for enabling or disabling the flow of the liquid to the flow region; and
- a flow meter disposed between the liquid source and the torch along the liquid supply conduit for measuring the flow rate of the flow of the liquid in the liquid supply conduit.

10. The plasma arc torch system of claim 1, wherein the vent passage has an inlet located upstream from the nozzle exit orifice.

11. The plasma arc torch system of claim 1, wherein the shield exit orifice is aligned with the nozzle exit orifice to define a conduit for expelling the liquid, the plasma arc and an unionized portion of the plasma gas.

12. The plasma arc torch system of claim 1, wherein the liquid introduced to the shield has low or no swirl.

13. The plasma arc torch system of claim 1, wherein the nozzle exit orifice is configured to constrict the plasma arc exiting the plasma chamber to the flow region via the nozzle exit orifice.

14. The plasma arc torch system of claim 1, wherein the plasma gas is at least one of nitrogen, F5 or air.

15. The plasma arc torch system of claim 1, wherein the liquid is water.

16. The plasma arc torch system of claim 1, wherein a combination of the plasma gas and the liquid produces hydrogen.

* * * * *